United States Patent

[11] 3,573,799

[72] Inventors James Walter Drinnan;
Roy Harold Mauger, Liverpool, England

[21] Appl. No. 766,415
[22] Filed Oct. 10, 1968
[45] Patented Apr. 6, 1971
[73] Assignee Automatic Telephone & Electric Company Limited
Liverpool, England
[32] Priority Oct. 11, 1967
[33] Great Britain
[31] 46371/67

[54] SERIAL TO PARALLEL CONVERTER
6 Claims, 2 Drawing Figs.

[52] U.S. Cl. .......... 340/347, 235/92
[51] Int. Cl. .......... G06f 5/04
[50] Field of Search .......... 340/347, 166, 172.5; 235/92; 178/18 (TR)

[56] References Cited

UNITED STATES PATENTS 3,209,330 9/1965 Bonomo .......... 235/92X
3,355,732 11/1967 Lucas .......... 340/347

*Primary Examiner*—Thomas A. Robinson
*Assistant Examiner*—Charles D. Miller
*Attorney*—Blum, Moscovitz, Friedman, Blum and Kaplan

ABSTRACT: A serial to parallel converter for converting serially transmitted data into parallel form, comprises rows of toggles (TA, TB, TC—TD, TE, TF—TG, TH, TI) which are arranged to be controlled for storing in turn the serial data received from respective inputs (LZ, LY and LX). The data stored in parallel form in toggles (TA, TB and TC) from input (LZ) is moved to toggles (TD, TE and TF) and next to toggles (TG, TH and TI) as serial data is received sequentially from inputs (LY and LX).

INVENTOR

BY

ATTORNEY

SERIAL TO PARALLEL CONVERTER

The present invention relates to apparatus for use in data transmission systems and is more particularly concerned with such apparatus which includes equipment for converting serially transmitted data words into parallel form and for converting serially transmitted data words into parallel form and for converting parallel data words into serial form ready for retransmission.

The invention has particular although not exclusive application to telephone switching systems which are used in association with incoming and outgoing junctions using time division multiplex (*t.d.m.*) transmission with each channel employing pulse code modulation. In such transmission systems each junction accommodates for example 24 transmission channels arranged in time division multiplex and each channel consists of eight binary digits transmitted in serial form. When a number of such transmission paths are connected to a telephone switching system it is necessary for all the similarly timed channels to be handled by the exchange within one channel time. For this purpose the data on eight transmission paths is combined to form a so-called receive "superhighway" which consists of eight parallel paths carrying instantaneously the eight bits of a single channel. Within one channel time (i.e. eight-bit periods) the eight similarly timed channels are applied to the receive superhighway sequentially each being assigned a specific bit time.

It is one of the objects of the present invention to provide a relatively simple arrangement for converting serial data into parallel form for use in a data transmission system of the above-mentioned type.

A similar situation is encountered at the output side of the exchange where it is necessary to reconstitute the serial arrangement for the eight bits of a channel from the "transmit" superhighway. Accordingly it is a further object of the invention to provide an apparatus for performing this function.

The various features of the invention will be more readily understood from the following description which should be read in conjunction with the accompanying drawings.

Figure 1:
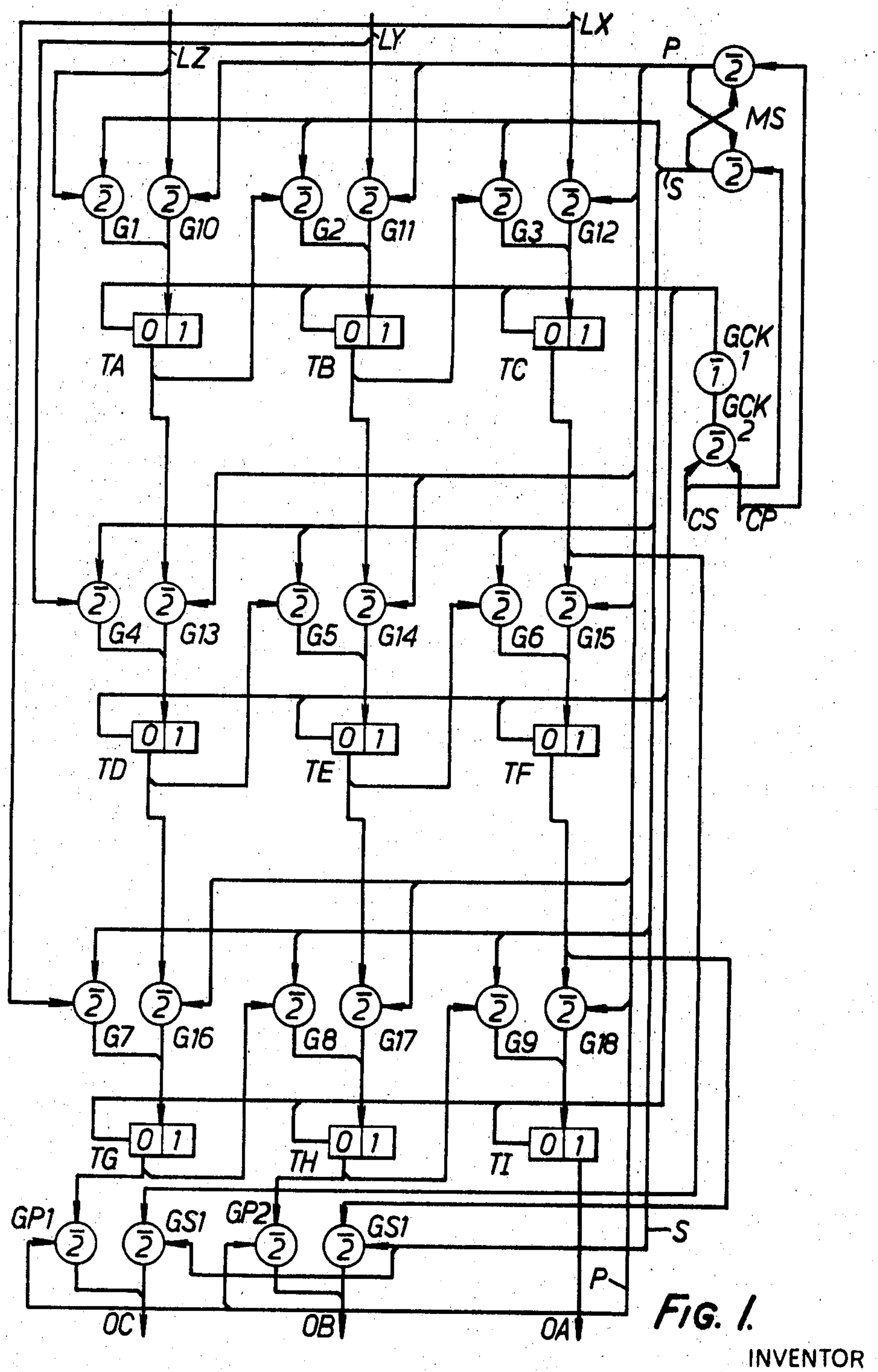
Figure 2:
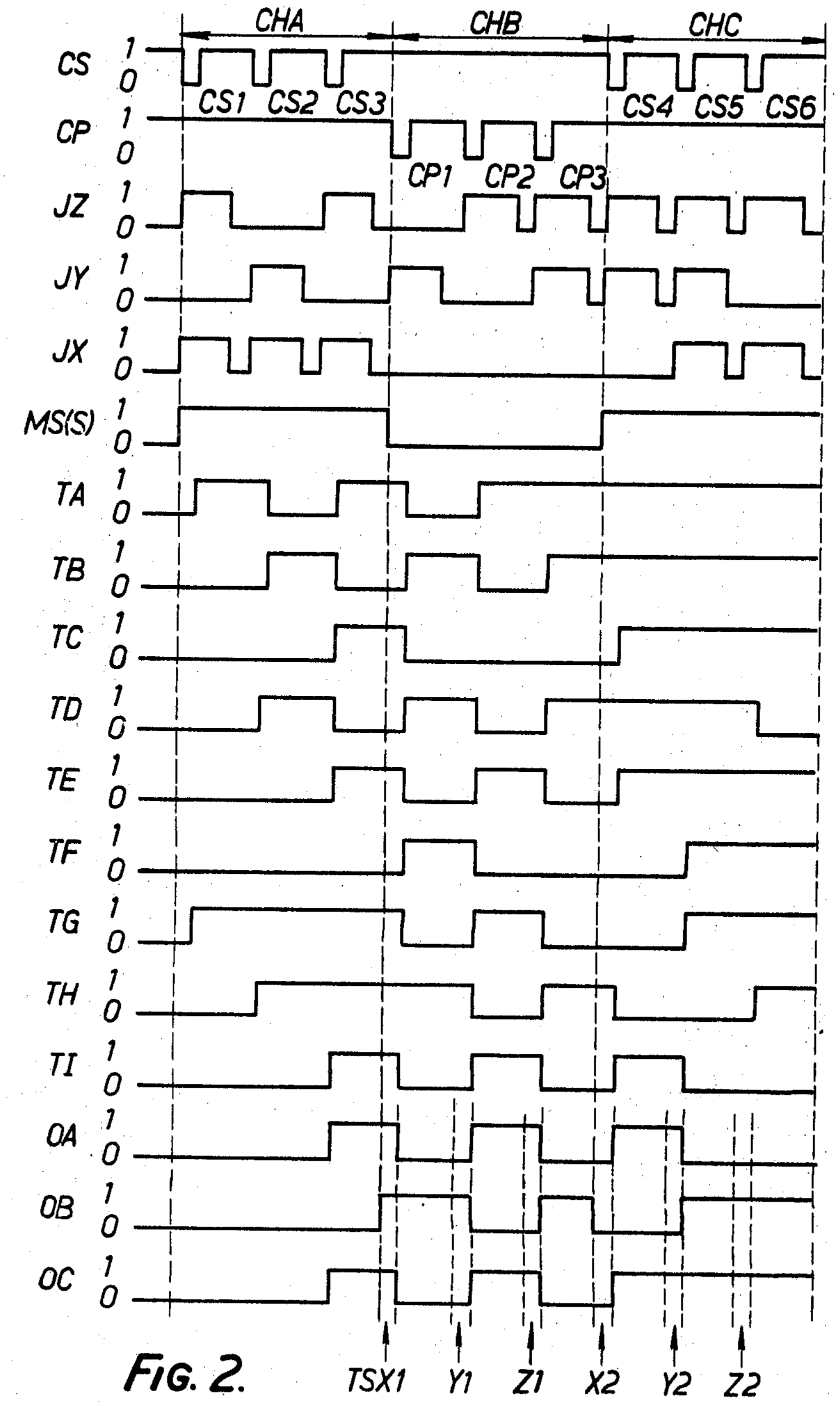

Of the drawings:

FIG. 1 shows a simplified circuit diagram of one embodiment of the invention for use in converting serially received data from three transmission paths into parallel form; while FIG. 2 shows waveforms of specific points in FIG. 1.

The equipment shown in FIG. 1 has been simplified from that which would be required for handling the normal 24 channel eight bits per channel system, however, the techniques employed for the three bits per channel arrangement of FIG. 1 and the normal arrangement are very similar. The inputs to the converter equipment are shown at the top of FIG. 1 as leads LX, LY and LZ and they consist of the inverted output of three separate *t.d.m.* transmission systems. Each system, of course, would normally have 24 t.d.m. channels of eight bits each on them calling for eight toggles per row and eight rows of toggles instead of the three-by-three array shown in FIG. 1.

The converter of FIG. 1 is very similar in construction to that shown in our copending British Application No. 38,426/67. In this application there is shown a shift register arrangement each stage of which consists of a clock controlled toggle circuit arranged to assume the same condition as its single input lead dictates when the trailing edge of a clock pulse occurs. The single input lead is fed from the ORed outputs of two input NAND gates one of which is termed a "parallel" input gate while the other is termed a "serial" input gate. Each NAND gate is of the type which produces a 0 state output when all its inputs are in the 1 state and a 1 output when any of its inputs are in the 0 state. The shift register is formed of a number of rows in a matrix of toggles and each row may be connected as a shift register, by priming the "serial" input gates G1 to G9, or as a parallel register by priming the "parallel" input gates G10 to G18. Arrangements are provided in the copending application for " shifting down" (a) one complete row at a time, when the parallel input gates are primed, or (b) row to row a bit at a time from the last toggle of a row into the first toggle of the row below, when the serial input gates are primed. The circuit of the present invention differs from the copending application in that each row bar the bottom is provided with output gating arrangements (NAND gates GS1 and GS2) in place of the serial connection from row to row of application NO. 38,426/67 and the input connections are applied to one input of individual toggles of the first row and the other input of corresponding toggles of similarly numbered rows i.e. Lead LZ is connected to the so called "parallel" input gate G10 of toggle TA and the "serial" input gate G1 of that toggle; lead LY is connected to the "parallel" input gate G11 of toggle TB and the serial input gate G4 of toggle TD, while lead LX is connected to the "parallel" input of toggle TC and the "serial" input of toggle TG).

As in the copending application a mode switch MS and a clock pulse combination circuit (NAND gates GCK1 and GCK2) are provided. The mode switch MS produces a 1 state output on lead P when the parallel clock pulse source CP is active (a 1 state condition on lead P primes all the "parallel" input NAND gates G1 to G9) and a 0 state output on lead S (a 1 state condition on lead S primes all the "serial" input NAND gates G10 to G18) and vice versa when the serial clock pulse source CS is active. The clock pulse sources are arranged to produce blocks of 0 going pulses alternately at the same repetition rate. Each block of pulses corresponds in number with the number of data bits in a channel, hence, in the embodiment of FIG. 1 one clock pulse source produces "bursts" of three clock pulses each separated by an equivalent quiescent period, the other pulse source produces bursts of three block pulses, corresponding in time to the quiescent period of the other clock pulse source, separated by an equivalent quiescent period which corresponds in time with the burst of pulses produced by the other clock pulse source. The waveforms marked CS and CP in FIG. 2 show the relationship between the two clock pulse sources in operation.

Waveforms JZ, JY and JX in FIG. 2 show arbitrary combinations of pulses for the first three channels CHA, CHB and CHC of the *t.d.m.* transmission systems connected to leads LZ, LY and LX in FIG. 1. It should be noted that it is necessary to apply the input data in inverted form as each input pulse is subjected to inversion by an input NAND gate before application to a toggle. Hence the condition on leads LZ, LY and LX (in FIG. 1) will be inverted from those of JZ, JY and JX (in FIG. 2).

Consideration will now be given to both FIGS. 1 and 2 in the explanation of the operation of the conversion equipment of FIG. 1. As mentioned previously each channel consists of three data bits and therefore is made up of three time slots. The repetition rate of the clock pulse sources is arranged to correspond to that of these time slots. The following description commences from the point at which the reception of the first pulse in channel A of each of the three *t.d.m.* transmission systems on junctions JZ, JY and JX occurs it will be assumed that no data at all has been received prior to this point (i.e. toggles TA to TI are all reset).

Reception of the first channel (CHA)

Coincident with the start of the reception of the first pulse on each of the three junctions, a clock pulse is produced by clock pulse source CS (shows as CS1 in FIG. 2). This causes the switching of mode selector MS to the S state (i.e. a 1 on lead S and a 0 on lead P). Hence the NAND gates G1 to G9 will be primed and, as 0 state pulses are being received on leads LZ and LX (i.e. 1 state pulse on junction JZ and JX as shown in FIG. 2) NAND gates G1 and G7 will be closed, producing a 1 state output, while all the other NAND gates including gate G4 will be opened to produce 0 state outputs.

When the trailing edge of the first clock pulse (CS1) occurs, toggles TA and TG will be switched to the 1 state, as gates G1 and G7 are closed (i.e. producing a 1 state output), while the toggle TD will remain reset. The waveforms TA to TI in FIG. 2 show the states of the various toggles in FIG. 1. At this point NAND gates G2 and G8 will be closed by the set states of toggles TA and TG respectively. The circuit of FIG. 1 remains in the above state until the next clock pulse, from clock pulse source CS, occurs.

The occurence of the second clock pulse (CS2 in FIG. 2) will be coincident with the reception of the start of the second pulse on each of the three systems. Hence input NAND gates G4 and G7 will be closed to produce 1 state outputs while NAND gate G1 will be opened to produce a 0 state output, all these output conditions corresponding to the current state of the junctions associated with leads LY, LX and LZ respectively.

When the trailing edge of the second clock pulse (CS2 in FIG. 2) occurs toggles TA, TB, TD and TH change states causing the first two bits of channel CHA on (a) the junction serving lead LZ to be placed in toggles TB and TA, (b) the junction on serving lead LY to be placed in toggles TE and TD and (c) the junction serving lead LX to be placed in toggles TH and TG. It will be noted by reference to FIG. 2 that toggle TG does not change state at this point at both bits received so far in channel CHA on the *t.d.m.* system associated with lead LX are 1's. The setting of toggles TB, TD, TG and TH causes the closing of NAND gates G3, G5, G8 and G9 respectively. These NAND gates produce 1 state outputs ready for the occurrence of the third clock pulse, from clock pulse source CS.

When the leading edge of the third clock pulse (CS3) occurs, concurrent with the occurrence of the leading edges of third bits of channel CHA for the three *t.d.m.* junctions, gates G1 and G7 will be closed by the 1 state data bits on the junctions associated with leads LZ and LX producing 1 state outputs therefrom, and gate G4 will be opened by the 0 state data bit on the junction associated with lead LY producing a 0 state output therefrom.

When the trailing edge of the third clock pulse (CS3) occurs toggles TA, TC, TE and TI are set while toggles TB and TD are reset. It should be noted that toggle TF remains reset and toggles TG and TH remain set at this point. Hence the top row of toggles in FIG. 1 (toggles TA, TB and TC) will be registering the three bits 101 of channel CHA for the *t.d.m.* junction JZ (associated with lead LZ). The middle row of toggles (TD, TE and TF) will be registering the three bits 010 for channel CHA of the *t.d.m.* junction JY (associated with lead LY) while the bottom row of toggles TG, TE and TI) will be registering 111 as specified by channel CHA for *t.d.m.* junction JX. The equipment remains in the above state until the occurrence of the next strobe pulse, thus, completing the operation of the circuit for the reception of the data bits of the first channel of each of the *t.d.m.* transmission systems. It should be noted that the output gate GS1 will be opened when toggle TG was set giving a 1 state output on output lead OC and, when toggle TI is set a 1 state condition will be produced on lead OA. Leads, OA, OB and OC as mentioned previously form the input to a "superhighway," however, the information presented to this highway is arranged to be under cock control, hence, the above stated conditions have no effect at this point.

As mentioned previously the two clock pulse sources CS and CP are operated in an interrelated manner each clock pulse source alternating in the production of clock pulses for succeeding channels. This has the effect of switching the state of the mode selector MS at the start of each channel.

Thus at the start of the reception of the first bits for channel CHB the leading edge of the fourth clock pulse (CPI in FIG. 2) will be produced by clock pulse source CP and the mode delector MS will be switched to its P state (i.e. 1 on lead P and 0 on Lead S) as shown by waveform MS(S) in FIG. 2. This causes gates G10 to G18 to be primed together with output gates GP1 and GP2. Gates G1 to G9 together with output gates GS1 and GS2 will be inhibited by the 0 state of lead S. At this point the state of output leads OA, OB and OC will be presented to the superhighway, under the control of the current clock pulse. As gates GP1 and GP2 have been primed, by the 1 state of lead P, leads OA, OB and OC will take up the states of toggles TI, TH and TG respectively. Hence the first clock pulse of channel CHB causes the data bits received from junction JX in the previous channel time to be gated onto the superhighway. The reference TSX1 (time slot X1) in FIG. 2 indicates this operation showing that the condition 111 is applied to the superhighway.

The leading edges of the first data bits for channel CHB cause gates G10 and G12 to be opened, producing a 0 state output therefrom while gate G11 remains closed, producing a 1 state output. At this time also the 1 state of lead P causes gates G14, G16 and G18 to be opened (as toggles TB, TD and TF are reset) and gates G13, G15 and G17 to be closed (as toggles TA, Tc and TE are set).

When the trailing edge of the fourth clock pulse, the first from clock pulse source CP, occurs (a) the 010 condition, received from junction JY in the previous channel by toggles TD, TE and TF, will be written into toggles TG, TH and TI, (b) the 101 condition, received in the previous channel from junction JZ by toggles TA, TB and TC, will be written into toggles TD, TE and TF (c) the first pulses of each of the junctions for channel CHB will be written into toggles TA, TB and TC and (d) transfer of the conditions of output leads OA, OB and OC to the superhighway will be terminated.

Toggles TA, TB and TC assume the 010 conditions respectively and the states of all the other toggles may be seen from FIG. 2. The circuit of FIG. 1 remains in the above state, with output leads OA, OB and OC producing the states of toggles TI, TH and TG (010) which corresponds to the data bits received from junction JY in the previous channel (CHA) time, until the next clock pulse is produced.

When the leading edge of the first clock pulse (CP2 in FIG. 2), the second from clock pulse source CP, occurs the inverse of the second data bits for channel CHB will be being applied to leads LX, LY and LZ. Hence gate G12 and G11 will be closed, producing 0 state outputs therefrom, and gate G10 will be opened, producing a 1 state output therefrom. At this stage also leads OA, OB and OC will be connected to the superhighway and the code 010 received from junction JY in channel CHA will be passed onwards (point Y1 in FIG. 2 indicates this operation). Gates G16 and G18 will be opened at this stage while gate G17 will be closed causing the 101 code, received from junction JZ in channel CHA and currently being stored in toggles TD, TE and TF, to be applied to the inputs of toggles TD, TH and TI. Also gates G13 and G15 will be closed while gate G14 will be open applying the first three bits of each junction for channel CHB to the inputs of toggles TD, TE and TF.

When the trailing edge of the fifth clock pulse occurs (i.e. CP2), the code received from junction JZ in the previous channel will be written into toggles TD, TH and TI and the first bits for the current channel will be written into toggles TD, TE and TF while the second bits of the current channel will be written into toggles TA, TB and TC. Reference to FIG. 2 shows that toggles TG, TH and TI will now be in the 101 state respectively while toggles TD and TA will be in the 01 state corresponding to the first and seconds bits received from junction JZ in the current channel respectively, toggles TE and TB will be in the 10 state respectively (bits 1 and 2 from junction JY) and toggles TF and TC will be in the 00 state (bits 1 and 2 from junction JX). At this stage the interrogation of leads OA, OB and OC will be terminated. The circuit now awaits the concurrent occurrence of the reception of the third data bits from each junction and the leading edge of the sixth clock pulse (CP3).

The occurence of clock pulse CP3 causes leads OA, OB and OC to be connected to the superhighway allowing the code 101 received from junction JZ in channel CHA to be passed onwards in time slot TSZ1. At the same time the inverse of the third data bits of channel CHB will be applied to the leads LX, LY and LZ. Gates G10 and G11 will therefore be closed while gate G12 will be opened. At this stage also gates G13 and G17 will be open while gates G14, G15, G16 and G18 will be closed. The equipment is now ready to receive and register the final bits of channel CHB.

When the trailing edge of clock pulse CP3 occurs the transmission of the three bits (in parallel), forming the code received from junction LZ in channel CHA to the superhighway (via gates GP1, GP2 and the output of toggle T1), will be terminated and the last three bits of channel CHA will be shifted into the top row (toggles TA, TB and TC) while the contents of the top and middle rows will be shifted down to the row below. Reference to FIG. 2 shows that toggles TA, TB and TC will now be in the 110 state respectively, toggles TD, TE and TF will be in the 100 state respectively and toggles TG, TH and TI will be in the 010 state respectively. Thus the bottom row of toggles (TG, TH and TI) holds the first bits the middle row of toggles (TD, the and TF) holds the second bits and the top row holds the last bits received for channel CHB from junctions JZ, JY and JX respectively. Also within the channel time of channel time of channel CHB, coincident with the reception of each bit, the full code received in the previous channel is read-out of the equipment of FIG. 1 in parallel form on a one-at-a-time basis starting with that received from junction JX. The equipment now awaits the start of channel CHC.

Reception of the third channel

Coincident with the start of the reception of the first pulse on each of the three junctions a clock pulse is produced by clock pulse source CS. The leading edge of this clock causes the switching of the mode selector MS to the S state (i.e. a 1 on lead S and a 0 on lead P). This causes NAND gates G1 to G9 to be "primed" while gates G10—18 will be inhibited. Gates GS1 and GS2 will also be primed while gates GP1 and GP2 will now be inhibited. The equipment of FIG. 1 has now been switched from the "vertical" mode of reception to the "-horizontal" mode of reception while the output connections and the mode of transmission have been switched from the bottom row of toggles to the last toggle in each row.

The 000 code condition received from junction JX, over lead LX in FIG. 1, in channel CHB will be presented, via leads OA, OB and OC, for the duration of the above mentioned fourth CS clock pulse (seventh pulse in toto since the start of channel CHA).

When the trailing edge of clock pulse CS4 occurs the first bits of each CHC channel will be read into toggles TA, TD and TG while the second and third bits of each CHB channel will be shifted across FIG. 1 horizontally. This means that (a) toggles TC, TF and TI will now be storing a 101 condition respectively which was received from function JY in channel CHB, (b) toggles TH TE and TB will now be storing a 011 condition respectively (i.e. CHB from junction JX) and toggles TA, TD and TG will be storing 110 respectively (i.e. the first bits in channel CHC from junctions JZ, JY and JX respectively). Reference to FIG. 2 will show the above specified conditions. The occurrence of the trailing edge of clock pulse CS4 causes the termination of the X2 time slot.

When the next clock pulse occurs, clock pulse CS5, time slot Y2 is started allowing the data received in channel CHB from junction JY to be passed to the superhighway. The trailing edge of this clock pulse causes the termination of the X2 time slot and the shifting in horizontally of the second bits of channel CHC from the three junctions together with the horizontal right shift of the first bit for this channel and the bits for channel CHB from junction JZ. The various conditions can be seen from FIG. 2.

The occurrence of clock pulse CS6 has similar effects to those detailed above allowing the channel CHB data to or from junction JZ to be passed to the exchange superhighway and, at the trailing edge of this clock pulse, allows the horizontal shifting in of the last three bits from each junction.

Hence at the end of clock pulse CS6: (i) toggles TA, TB and TC will be set to the 111 states corresponding to the data bits received from junction JZ in channel CHC: (ii) toggles TD, TE and TF will be set to the 011 states respectively (toggle TF being set to that of the least sig. bit) corresponding to the data bits received from junction JY in channel CHC while (iii) toggles TG, TH and TI will be set to the 110 states respectively (toggle TI storing the first received bit) corresponding to the data bits received from junction JX.

The operation of the circuit of FIG. 1 will continue with the generation of three clock pulses CP3—6 (not shown in FIG. 2) from clock pulse source CP. This will cause the next three bits on each junction to be received and stored vertically (i.e. the bits on junction JZ will be placed into toggles TA, TD and TG) while the previous channel received bits will be read out in synchronism with the clock pulses, in time slots TS, X3, Y3 and Z3 (not shown in FIG. 2), from toggles TG, TH and TI (via gates GP1 and GP2 and leads OA, OB and OC).

Thus it will be seen that for every "odd" numbered channel (CHA, CHC etc.) the incoming data is fed into the converter horizontally while the data received in the previous channel is fed out from the last toggle of each row of toggles and in every "even" numbered channel (CHB, CHD etc.) the incoming data is fed into the converter vertically while the data received in the previous channel is fed out from the bottom row of toggles.

It will be realized that the converter imposes a one channel time delay on the incoming data, however, this can be corrected for by taking cognizance of the fact in the organization of the exchange switching system.

When the equipment of FIG. 1 is used at the output of the exchange to convert the three bit parallel data into serial form on the three *t.d.m.* out-going junctions the parallel data will be fed in inverse form to leads LX, LY and LZ and the three separate junctions will be fed from leads OA, OB and OC. The internal control arrangements for FIG. 1 will be the same as detailed above.

The above description has been of one embodiment only and the invention is not intended to be limited thereto. As mentioned previously it is not necessary to have three toggles per row and in fact the number of toggles per row, and rows of toggles, will be dictated by the number of bits in a "channel." Also it has been assumed that clock pulse source CS produces clock pulses for channel CHA, CHC etc. while clock pulse source CP produces for channels CHB, CHD etc. obviously this arrangement may be reversed.

We claim:

1. A shift register circuit arrangement for converting binary information on a plurality of input leads from a succession of serial data bytes to a succession of parallel data bytes, of *n* bits each, and including *n* rows and *n* columns of bistable devices, the bistable devices of each row are individually connected in series by first connecting paths each extending between the output path of a bistable device and the input path of the succeeding bistable device in the particular row and the bistable devices of each column are individually connected in series by second connecting paths each extending between the output path of a bistable device and the input path of the corresponding bistable device in the succeeding row, each of said first and second connecting paths including first and second gating devices respectively and control means are included arranged firstly to exclusively actuate all said first gating devices for the passage of a signal indicating the state of each bistable device to the succeeding bistable device and said control means is arranged secondly to exclusively actuate all said second gating devices for the passage of a signal indicating the state of each bistable device to the corresponding bistable device and each input lead is individually connected (i) by way of an additional first gating device to the input path of a particular one of the bistable devices of the first column of bistable devices and (ii) by way of an additional second gating device to the input path of a correspondingly numbered bistable device of the first row of bistable devices and the output paths of the *n*th row of bistable devices, except the last bistable device in that row, are connected to further second gating devices and the output paths of the *n*th column of bistable devices, except the last bistable device in that column, are connected to further first gating devices, the output paths from said first and second further gating devices together with the output paths from said excepted bistable device are used to provide output paths from said shift register circuits, said additional and further first gating devices and said additional and further second gating devices being controlled in like manner to said first and second gating devices respectively.

2. A shift register circuit arrangement as claimed in claim 1 in which bistable devices are controlled by clock pulses produced by said control means which also includes a bistable circuit arranged to produce (i) a first selection signal, to activate all said first gating devices and all said first additional and first further gating devices when in one state and (ii) a second selecting signal, to activate all said second gating devices and all said second additional and second further gating devices, when in the other state.

3. A shift register circuit arrangement as claimed in claim 2 in which said bistable circuit is controlled by conditions derived from two clock pulses leads, each lead carrying a pulse pattern consisting of a train of $n$ pulses followed by an equivalent period of no pulses and the pulse pattern on each clock pulse lead are arranged such that the train of $n$ pulses on one lead corresponds with the no pulse period on the other clock pulse lead, one of said conditions being generated while the train of pulses are present on one of said clock pulse leads and being active to drive said bistable circuit to said one state, and the other of said conditions being generated while the train of pulses is present on the other of said clock pulse leads and being active to drive said bistable circuit to said other state.

4. A shift register circuit arrangement for converting binary information on a plurality of input leads from a succession of parallel data bytes to a succession of serial data bytes, of $n$ bits each, and including $n$ rows and $n$ columns of bistable devices, the bistable devices of each row are individually connected in series by first connecting paths each extending between the output path of a bistable device and the input path of the succeeding bistable device in the particular row and the bistable devices of each column are individually connected in series by second connecting paths each extending between the output path of a bistable device and the input path of the corresponding bistable device in the succeeding row, each of said first and second connecting paths including first and second gating devices respectively and control means are included arranged firstly to exclusively actuate all said first gating devices for the passage of a signal indicating the state of each bistable device to the succeeding bistable device and said control means is arranged secondly to exclusively actuate all said second gating devices for the passage of a signal indicating the state of each bistable device to the corresponding bistable device and each input lead is individually connected (i) by way of an additional first gating device to the input path of a particular one of the bistable devices of the first column of bistable devices and (ii) by way of an additional second gating device to the input path of a correspondingly numbered bistable device of the first row of bistable devices and the output paths of the $n$th row of bistable devices, except the last bistable device in that row, are connected to further second gating devices and the output paths of $n$th row of bistable devices, except the last bistable device in that column, are connected to further first gating devices, the output paths from said first and second further gating devices together with the output paths from said excepted bistable device are used to provide output paths from said shift register circuits, said additional and further first gating devices and said additional and further second gating devices being controlled in like manner to said first and second gating devices respectively.

5. A shift register circuit arrangement as claimed in claim 4 in which said bistable devices are controlled by clock pulses produced by said control means which also includes a bistable circuit arranged to produce (i) a first selection signal, to activate all said first gating devices and all said first additional and first further gating devices when in one state and (ii) a second selecting signal, to activate all said second gating devices and all said second additional and second further gating devices, when in the other state.

6. A shift register circuit arrangement as claimed in claim 5 in which said bistable circuit is controlled by conditions derived from two clock pulses lead, each lead carrying a pulse pattern consisting of a train of $n$ pulses followed by an equivalent period of no pulses and the pulse pattern on each clock pulse lead are arranged such that the train of $n$ pulses on one lead corresponds with the no pulse period on the other clock pulse lead, one of said conditions being generated while the train of pulses are present on one of said clock pulse leads and being active to drive said bistable circuit to said one state, and the other of said conditions being generated while the train of pulses is present on the other of said clock pulse leads and being active to drive said bistable circuit to said other state.